May 22, 1956  K. B. MURRANT  2,746,501
SLICING MACHINE ATTACHMENT FOR OBLIQUE SLICING
Filed Dec. 6, 1952  2 Sheets-Sheet 1
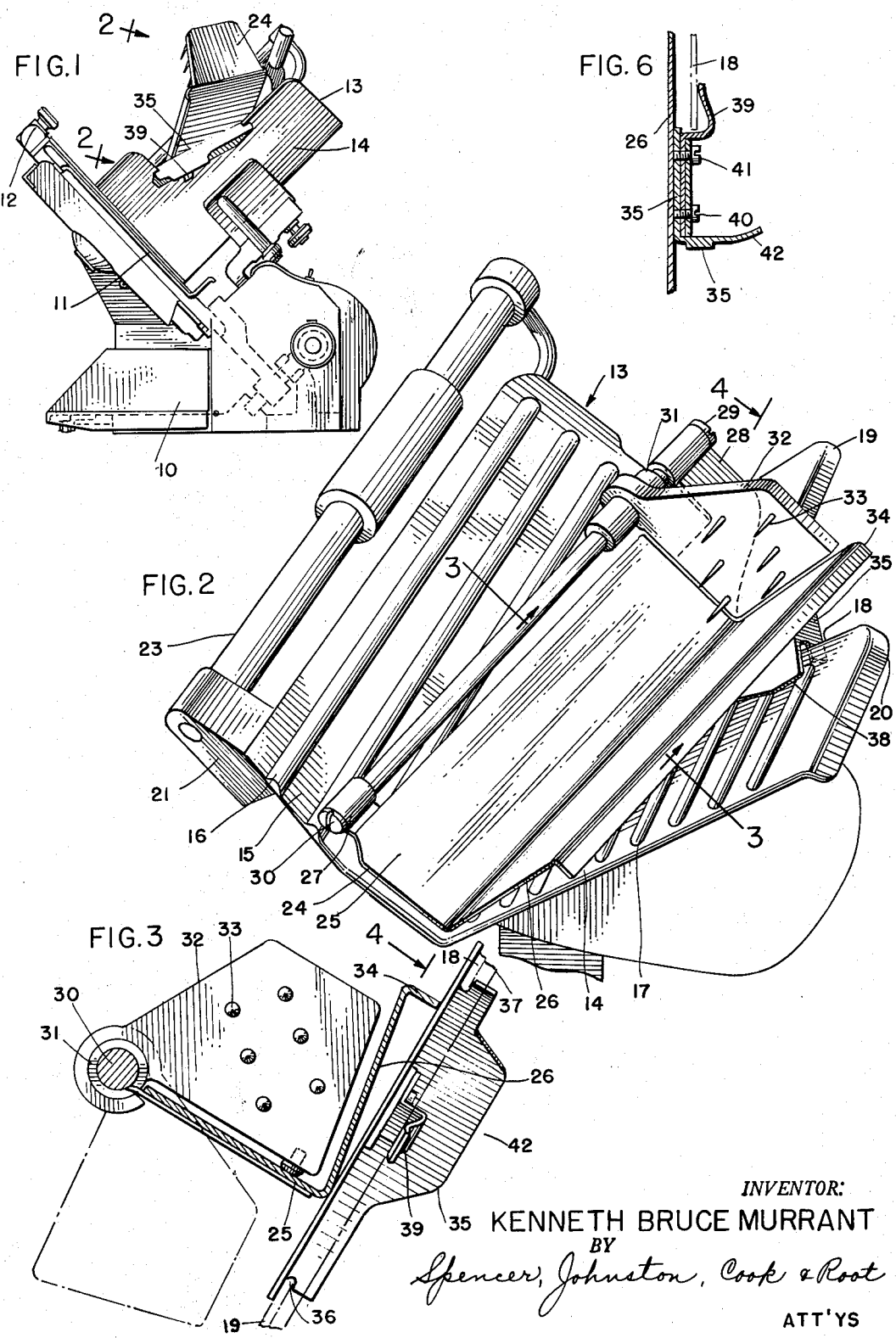
INVENTOR:
KENNETH BRUCE MURRANT
BY
Spencer, Johnston, Cook & Root
ATT'YS May 22, 1956  K. B. MURRANT  2,746,501
SLICING MACHINE ATTACHMENT FOR OBLIQUE SLICING
Filed Dec. 6, 1952  2 Sheets-Sheet 2
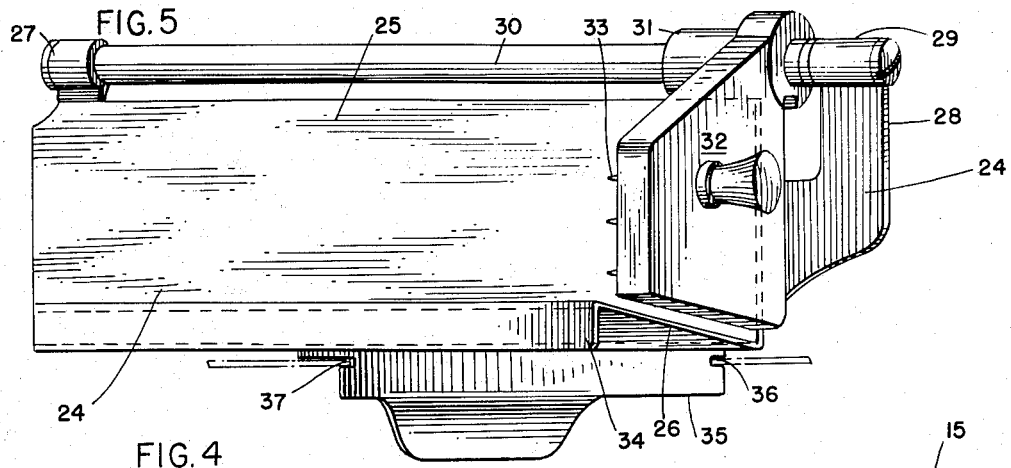
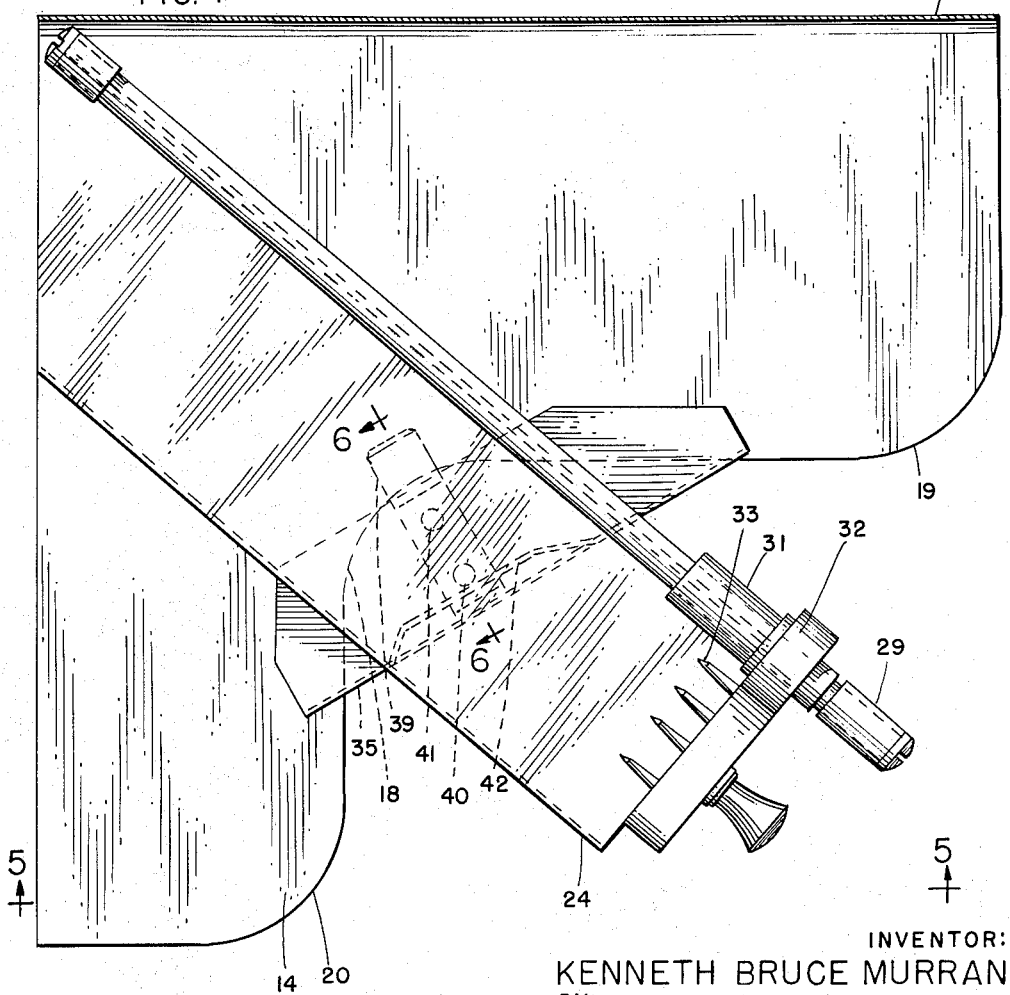
INVENTOR:
KENNETH BRUCE MURRANT
BY:
Spencer, Johnston, Cook & Root
ATT'YS

United States Patent Office 2,746,501
Patented May 22, 1956

2,746,501
SLICING MACHINE ATTACHMENT FOR OBLIQUE SLICING

Kenneth Bruce Murrant, London, England, assignor to U. S. Slicing Machine Company, Inc., La Porte, Ind., a corporation of Indiana Application December 6, 1952, Serial No. 324,466

Claims priority, application Great Britain February 6, 1952

1 Claim. (Cl. 146—102)

This invention relates in general to slicing machines for cutting meat and other edible substances into oblique slices and particularly to slicing machines provided with a food trough or main substance carrier. More specifically, the invention relates to an attachment for association with a main substance carrier having an L-shaped substance supporting portion for use in supporting the substance to be cut and in pushing a substance toward a blade so that oblique slices are cut.

In slicing machines of this character for which my attachment is designed, the machine generally includes a rotary slicing knife, an adjustable gauge plate for determining slice thickness and a main substance carrier along which the substance to be cut is fed towards the gauge plate with the aid of gravity.

One object of the present invention is to provide as an attachment for a slicing machine of the type stated a gravity feed support especially adapted for slicing obliquely a substance of easily cut texture.

Another object of the invention is to provide a gravity feed support that is readily attachable to the main machine and detachable therefrom by simple manipulation.

A further object of the invention is to provide an attachment for adaptation with a slicing machine of the type described wherein the slices obtained are of uniform thickness but oblique in cross section, that is, slices of uniform thickness that are greater in width than the substance from which they are cut.

My invention may be described generally as an attachment for a gravity feed type slicing machine having a gravity feed main substance carrier for ordinary slicing comprising a carrier adapted to be put upon the main carrier of the slicing machine and located thereon at an oblique angle to the slicing knife and means below the substance carrier of the slicing machine for detachably holding the attachment at a given angle of obliquity.

The attachment includes a substance carrier that is L- or V-shaped in cross section having a guide, a gravity feed pusher slidable along the guide and engageable with the substance that is to be sliced obliquely.

The slicing machine for which my attachment is designed may be described more specifically as a gravity feed type in which the main substance carrier consists of a downwardly inclined trough-like body, one part of which may be referred to as a sidewise inclined side wall and other as a platform. Both the platform and the wall are longitudinally ribbed or corrugated where they come in contact with the substance to be cut so as to enhance positioning of the substance on the carrier. Viewed downwardly, the platform of such a conventional slicing machine perpendicular to its plane is of L-shape, the side opposite to the knife including a deep rectangular recess with rounded corners. The wall of the carrier has surmounted thereon a guide bar on which the bearing sleeve of a substance pusher is slidably and turnably mounted, the pusher being turnable into an out-of-use setting beyond the substance support carrier.

The word "longitudinally" as applied to the ribs or corrugations located on the carrier means that such ribs extend parallel to and in the direction of the substance being fed into the machine, and perpendicular to the machine slicing plane.

Referring to the drawings which illustrate selected embodiments of the invention the objects as outlined will be apparent from the following description, the appended claims and the drawings in which:

Figure 1 is a side view of a typical slicing machine having mounted thereon my attachment;

Figure 2 is an enlarged side view as viewed from the plane indicated by the line 2—2 of Fig. 1;

Figure 3 is a cross section of Figure 2 along the lines 3—3;

Figure 4 is a partially sectional view as viewed in the direction indicated by the arrows 4—4;

Figure 5 is a side view of the attachment as viewed from the plane indicated by the line 5—5 of Figure 4; and Figure 6 is a detail view of the means used for attaching the support to the slicing machine.

Referring to the drawings the base of the slicing machine is designated generally at 10 with the slicing element indicated at 11 and means for adjusting the slicing blade at 12 as found in a conventional machine. The carrier of the machine is generally indicated at 13 being a downwardly inclined trough, one part of which is the sidewise inclined L-shaped supporting platform 14 and the other part being a sidewise inclined upwardly extending side wall 15. Both the platform and the wall are longitudinally ribbed as at 16 and 17 serving to position the substance normally mounted thereon when the attachment forming my invention is not used. As can be seen from Figures 2 and 4 the platform is essentially that of a squat L having a deep rectangular recess 18 with rounded corners 19 and 20 opposite the position of the knife. The side wall 15 has brackets 21 and 22 with a guide bar 23 extending between the brackets. In ordinary use of the machine a substance pusher (not shown) is slidably and turnably mounted on the guide bar 23 and may be turned into an out-of-use setting beyond the wall.

The attachment comprising my invention is indicated generally at 24 being a trough-like substance support having a leading wall 25 and a trailing wall 26. The leading wall has a bracket 27 and an arm 28 with a spaced apart socket 29. The bracket and socket support a guide bar 30 carrying a bearing sleeve 31 having mounted thereon a substance pusher 32. The pusher is spiked as at 33 so as to facilitate positioning and retention of the substance to be cut on the attachment. The pusher may be rotated upwardly into an out-of-use setting beyond the leading wall 25 as indicated in dotted lines in Figure 3.

The trailing wall 26 is downwardly flanged at 34 and is designed to be placed upon the platform of the carrier 13 at an angle that is substantially oblique to the direction of the ribs 16 and 17 and the slicing plane 11. As shown in Figures 2 and 4 the angle of obliquity is approximately 45°. The leading wall 25 of the attachment abuts against the ribs of side wall 15 of the main support near the slicing plane and the flange 34 of the trailing wall abuts in part the ribs on the platform 14 of the main support.

Secured to the underside of the trailing wall is a fitting 35 having grooves 36 and 37 designed for insertion upon rounded corners 19 and 20 of the main support and across the recess 18 of the support. The fitting consequently abuts the platform at 38 as shown in Figure 2. Affixed to the underside of the fitting is a spring clip 39 formed of spring metal or other suitable material and fastened to the fitting by means of machine screws 40 and 41. The fitting 35 having a downturned flange as indicated at 42, the operator may conveniently grasp said flange to hold the entire attachment and place it in operating position upon the main substance carrier by pushing it into place until the spring clip 39 grips the underside of platform 13. By placing his fingers below the downturned flange 42 the operator can instantly detach the attachment as a unit from the machine by simply pulling and lifting it from the main support.

From this description it is readily seen that the attachment I describe embodies a convenient unit adapted for mounting upon the conventional slicing machine of the type described permitting oblique slicing of such substances as may be desired.

Changes may be made in the form, construction and arrangement of parts from those disclosed herein without in any way departing from the spirit of the invention or sacrificing any of the attendant advantages thereof, provided, however, that such changes fall within the scope of the claim appended hereto.

The invention is hereby claimed as follows:

A slicing machine comprising a reciprocal carriage, a main L-shaped substance support, V-shaped in cross section and inclining vertically downward on said carriage, a food pusher receivable in and slidable along said support, and a second V-shaped substance support relatively V-shaped in cross section and adapted to be removably secured to the first substance support and at an angle thereto, whereby a substance on the main support may be cut perpendicularly or a substance on the second support may be cut obliquely; said second support being detachably connected to the first support, attachment means including a fitting mounted on the lower part of the second support to position the second support at an oblique angle with respect to the first support, there being means including recesses in opposite faces of the second support for engagement with the main substance support, said recesses engaging one of the legs of the L-shaped main support, a spring clip adapted to clamp against the bottom of said main substance support near the intersection of the legs of the L-shaped main support, and a depending flange portion which can be gripped manually to push said attachment into place on the main substance support and to remove it therefrom by pulling.

References Cited in the file of this patent

UNITED STATES PATENTS

| | | |
|---|---|---|
| 2,050,786 | Folk | Aug. 11, 1936 |
| 2,275,524 | Gronich | Mar. 10, 1942 |
| 2,431,390 | Folk | Nov. 25, 1947 |

FOREIGN PATENTS

| | | |
|---|---|---|
| 451,120 | Great Britain | July 30, 1936 |
| 516,778 | Great Britain | Jan. 11, 1940 |